Feb. 25, 1936.  O. N. GREDELL  2,031,885
CLOSURE MEMBER FOR FILL OPENINGS
Filed May 18, 1932  2 Sheets-Sheet 1

INVENTOR.
Otto N. Gredell
BY
ATTORNEY.

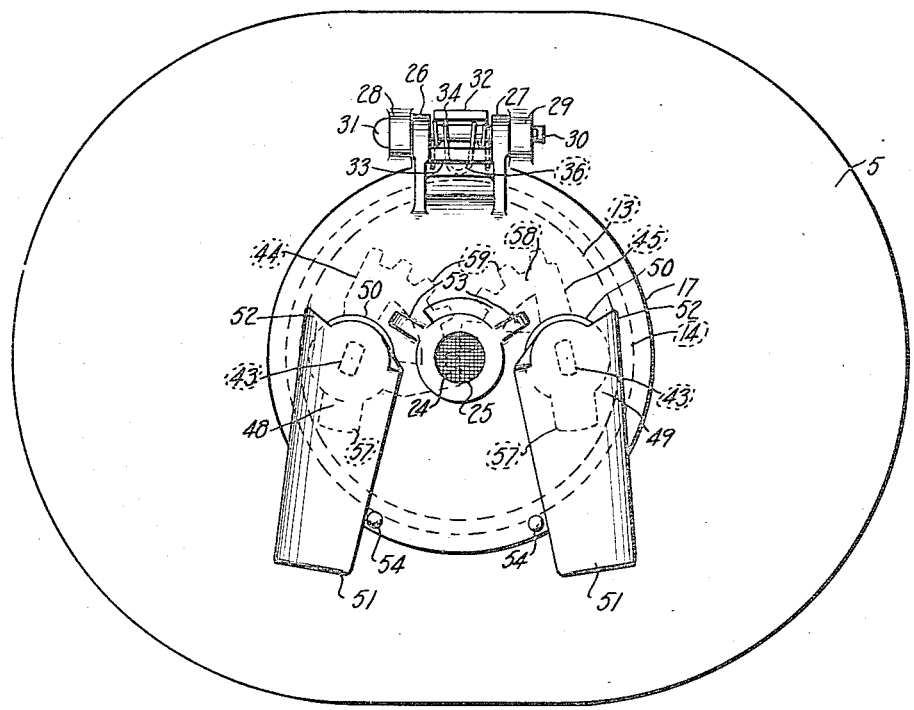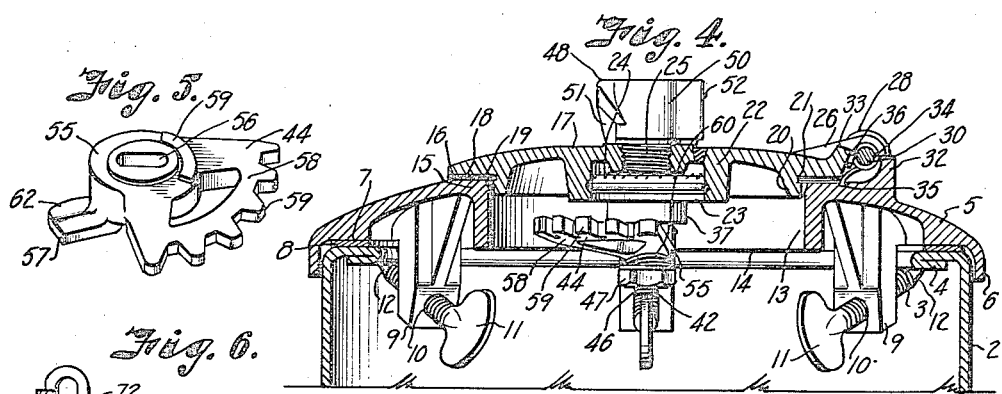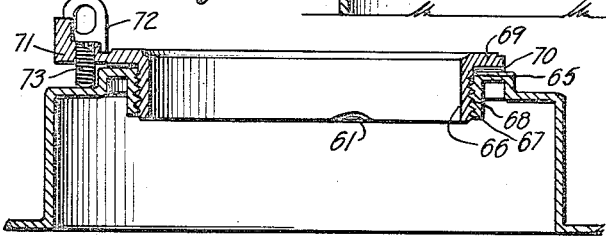

Patented Feb. 25, 1936

2,031,885

UNITED STATES PATENT OFFICE 2,031,885

CLOSURE MEMBER FOR FILL OPENINGS

Otto N. Gredell, Kansas City, Mo., assignor to Standard Steel Works, North Kansas City, Mo., a corporation of Missouri Application May 18, 1932, Serial No. 612,045

11 Claims. (Cl. 220—55)

This invention relates to fill caps for closing the fill openings of truck tanks and the like, and has for its principal object to provide a fill cap that is quickly opened and closed and which is securely clamped in closed position to prevent leakage of liquid and vapors from the tank.

Another important object of the invention is to provide a fill cap particularly suitable for tanks employing in their construction relatively soft metals such as aluminum and aluminum alloys.

It is a further object of the invention to provide a quick opening cap which may be adapted for use on present tanks employing the ordinary screw threaded type of plug.

In accomplishing these and other objects of the invention, I have provided improved details of structure, the preferred forms of which are illustrated in the accompanying drawings, wherein:—

Fig. 3 is a top plan view of the manhole cover and fill cap showing the latch operating handles in position to allow opening of the cap.

Fig. 4 is a vertical sectional view on the line 4—4, Fig. 1.

Fig. 5 is a detail perspective view of one of the clamping members.

Fig. 6 is a vertical sectional view through an adapter ring whereby the ordinary screw threaded fill plugs may be replaced with a quick opening fill cap embodying my invention.

Referring more in detail to the drawings:—

1 designates the upper wall of a truck tank or the like equipped with a substantially elliptical manhole 2 having an opening 3 therein, as in ordinary truck tank construction.

Figure 1:
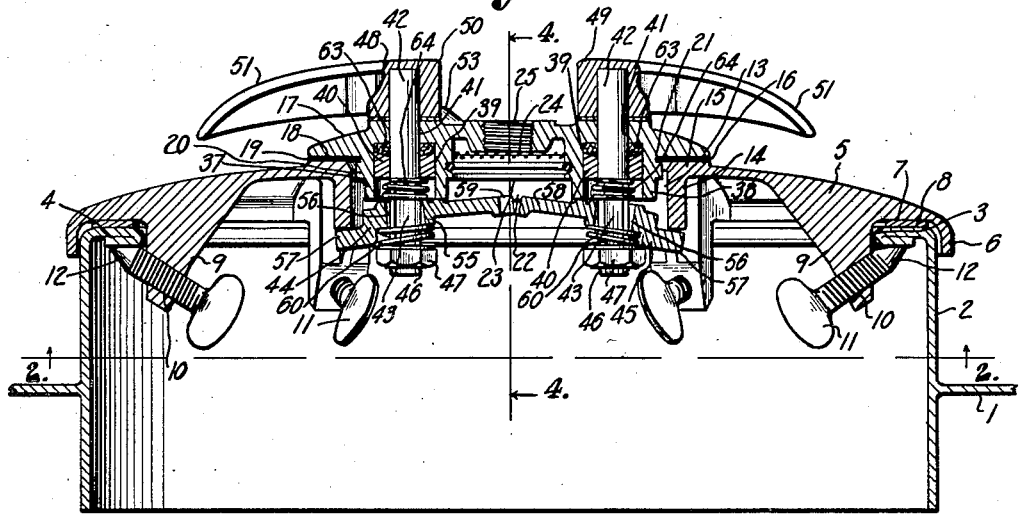
Fig. 1 is a vertical section through a manhole of a tank equipped with a fill cap constructed in accordance with my invention.

In the form illustrated the rim encircling the manhole opening 3 is turned back upon itself to form a reinforced frame 4 to seat a cover 5 having a shape similar to that of the rim, and which is provided with a depending annular flange 6 overlapping the upper periphery of the rim, as illustrated in Fig. 1.

Formed on the under face of the cover and extending circumferentially within the flange 6 is a horizontally positioned gasket seat 7 for retaining a gasket ring 8 in sealing contact with the rim or frame 4.

Formed integrally with the cover and projecting within the manhole opening 3 is a series of depending lugs 9 having threaded openings 10 extending upwardly at an incline toward the rim 4 and in which are threadedly mounted thumb screws 11 having cone-shaped ends 12 adapted to rotatably and slidably engage the rim 4, to clamp the cover member tightly on its seat. Formed in the center of the cover member is the usual fill opening 13 which is of suitable diameter to receive an ordinary fill spout (not shown).

Depending from the lower face of the cover and encircling the fill opening 13 is a flange 14 adapted to be engaged by clamping members on the hinged fill cap or closure later described. Formed on the upper face of the manhole cover and extending circumferentially of the opening is a boss 15 forming a horizontal gasket seat 16.

The fill cap or closure member for the fill opening includes a concavo-convex disk 17 having a suitable diameter to overlap the seat 16.

Formed on the under face of the disk in line with the seat 16 and adapted to engage thereagainst is a horizontally arranged shoulder 18 which encircles a depending flange 20 arranged to extend within the fill opening 13. A gasket ring 19 is retained in position against the shoulder 18 by having its inner diameter received in a groove 21 formed in the flange 20 to seal the cap with relation to the cover when the cap is in closed position.

Depending from the lower face of the cap is a centrally located boss 22 having a downwardly opening recess 23 to accommodate a flame arrester 24 for protecting a breather opening 25 formed in the axis of the closure. The breather opening 25 is closed by an ordinary valve fitting (not shown) which forms no part of the present invention. The cap thus described is hinged to the cover at one side thereof as now to be described.

Projecting from the periphery of the cap or closure member are spaced ears 26 and 27 which cooperate with complementary spaced lugs 28 and 29 on the manhole cover and extending therethrough is a hinge pin 30 having a head 31 on one end to engage the lug 28 and a cotter pin at its opposite end to engage the lug 29 to retain it in functional position for fulcruming the cap so that it may be swung to and from closing position on its seat. Also formed on the manhole cover and extending upwardly between the lugs 28 and 29 is a stop lug 32 cooperating with a similar stop lug 33 on the cap to limit opening movement thereof and to prevent dropping thereof against the tank.

In order to prevent slamming of the cap against its seat, I sleeve a coil spring 34 on the hinge pin having its opposite ends anchored in a recess 35 in the manhole cover, and having an intermediate loop or tongue portion 36 engaging against the lug 33, which serves as a check to the cap when it is moved to closed position and tends to hold it slightly open to make it necessary to latch the cap in order to retain it closed.

Extending from the lower face of the cap or closure member at opposite diametrical points and at right angles to the hinge thereof are spaced bosses 37 and 38 having recesses 39 for slidably supporting a packing gland 40 later described.

Formed in the cap and extending axially through the bosses are bearing openings 41 for rotatably mounting vertical shafts 42. The shafts 42 are provided with flattened lower ends 43 for slidably supporting clamping members 44 and 45, respectively. The lower ends of the shafts terminate below the clamping members in threaded extensions 46 for mounting jam nuts 47 to retain the clamping members in position, as later described. The upper ends of the shafts project above the upper face of the fill cap to mount handle members 48 and 49 by which the shafts may be rotated to move the clamping members to and from clamping position.

The handle members 48 and 49 each include a socket or hub portion 50 to which the ends of the shafts are secured, and extending outwardly and downwardly therefrom are curved arms 51 forming handles by which leverage may be applied to the shafts. Extending laterally from the socket portions 50 are stop lugs 52 adapted to engage against stop lugs 53 projecting from the face of the cap when the arms are in position to effect clamping of the clamping members. Movement of the handle members is limited in the opposite direction by lugs 54 on the fill cap.

Figure 2:
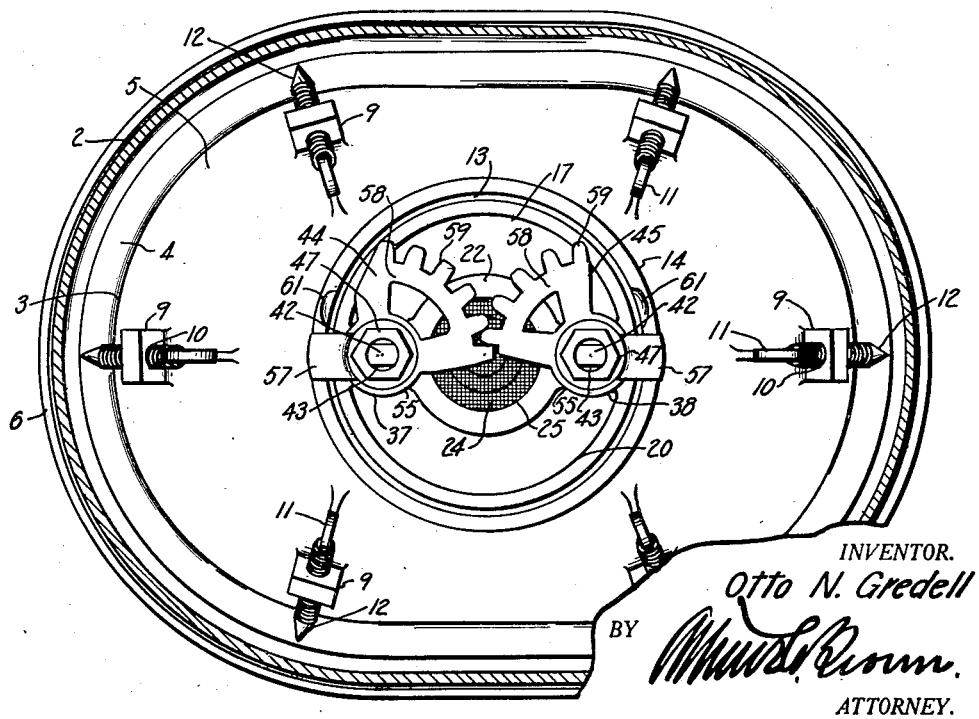
Fig. 2 is a horizontal sectional view on the line 2—2, Fig. 1, illustrating the clamping members for locking the fill cap in closed position.

The clamping members are best illustrated in Figs. 2 and 5 and include hub portions 55 having elongated openings 56 to receive the flattened ends of the shafts. Extending radially from the hub portions 55 are lugs 57 adapted to engage under the lower face of the flange 14, as illustrated in Fig. 1, and extending oppositely therefrom are gear sectors 58 having teeth 59 which are adapted to intermesh so that when one of the clamp members is rotated the other will be rotated simultaneously to move the lugs 57 to and from clamping position.

Due to the elongated openings 56 the clamping members are pivotally and slidably supported on the shafts, as illustrated in Fig. 1, but are prevented from rotation thereon so that the lugs 57 may be engaged under the flange 14 when the shaft is rotated.

To retain the clamping members in clamping position against the ends of the bosses 37, I provide coil springs 60 having one end bearing against the lower face of the hub portions 55 and their opposite ends bearing against the jam nuts 47 previously described. When the clamping members are engaged with the bosses, the lugs 57 thereon are positioned above the lower face of the flange 14 so that when the lugs are turned to engage the flange it is necessary that they tension the springs 60 when they ride thereon so that the springs will move the lugs into notches 61 formed in the flange, to prevent jars and jolts from loosening the clamping members. In this position the clamping members are in slightly tilted position and have one side thereof bearing against the bosses. It is, therefore, apparent that wearing of either the lug or the flange does not affect clamping of the lid because ample space is provided between the opposite side of the bosses and the hub portions, as shown in Fig. 1. Also the wear of the bosses will in most cases offset wear of the lugs so that the space is maintained throughout the life of the tank. In order to assure easy engagement of the lugs with the flange they are provided with bevelled forward edges 62.

In order to retain the packing glands 40 in sealing engagement with packing rings 63 which are received in the bottoms of the recesses 39, I provide each shaft with a spring 64 sleeved thereover and having one end bearing against the packing glands and the opposite end against the hub portion of the lugs, as illustrated in Fig. 1.

In Fig. 6 is illustrated an adapter ring for use in connection with an ordinary manhole cover having a threaded fill opening 65. The adapter ring includes a depending flange portion 66 having external threads 67 to engage the threads 68 on the manhole cover. Extending laterally from the flange 66 is an annular flange 69 adapted to seat against a gasket 70 supported on the upper face of the manhole cover.

Extending from the periphery of the flange 69 is an extension 71 having spaced lugs 72 similar to the lugs 28 and 29 to pivotally mount a closure member having the same construction as that illustrated in Figs. 1 to 4, inclusive. In order to lock the adapter ring from rotation relatively to the manhole cover, I provide the extension 71 with a set screw 73 adapted to bear against the upper face of the cover as shown.

In using a fill cap constructed and assembled as described and assuming that the cap is in closed position, the cap may be opened by moving the lever arms 51 toward each other, as illustrated in Fig. 3, thereby rotating the shafts 42 in their bearing openings 41 to move the lugs 57 from under the lower face of the flange 14. Due to the intermeshing of the gear segments 58, the lugs 57 are moved simultaneously so that both lugs are disengaged at the same time to allow release of the cap. The cap may then be hinged backwardly away from the fill opening until the lug 33 engages against the lug 32, the lugs being of sufficient length to permit the cap to pass a vertical center line through the pivot shaft so that it will remain in open position.

To close the fill cap, it is swung in the opposite direction until stopped by the spring 34. The spring will then hold the cap in slightly opened position, making it necessary to apply pressure to the handle members 51 to move it to its seat 15, at which time the handles may be rotated in the opposite direction until the lugs 52 engage against lugs 53 on the cap. During rotation of the handle members, the lugs 57 are moved under the lower face of the flange 14 to clamp the cover tightly against its seat.

It is apparent that wear of the lugs or the lower face of the flange is compensated for by the springs 60, and that the lugs are retained in clamping position thereby until they are released upon rotation of the handle member.

What I claim and desire to secure by Letters Patent is:

1. In a device of the character described, a closure member, a shaft rotatably supported by the closure member, a clamping member supported on the shaft for rotation therewith and rockable thereon in a plane parallel to the axis of the shaft, a spring yieldingly retaining the clamping member in clamping position, and a handle member on the shaft for rotating the clamping member to and from clamping position.

2. In a device of the character described, a closure member having a bearing opening extending therethrough, a shaft member rotatably mounted in said opening, a packing gland slidably mounted on the shaft for sealing the opening about said shaft, a clamping member slidably fixed to said shaft, a spring on the shaft retaining the clamping member in clamping position, a second spring on the shaft engaging the clamping member and the packing gland for retaining the packing gland in packing position, and means for rotating the shaft.

3. In a device of the character described, a cover member having a fill opening therein and a seat encircling the opening, a closure member hinged to the cover member, a gasket ring carried by the closure member and adapted to engage said seat when the closure member is in closed position, spaced actuating shafts rotatably mounted in the closure member, clamping members loosely and slidably retained on said actuating shafts for rotation therewith, intermeshing gear segments on the clamping members to operate the clamping members in synchronism, means yieldingly urging the clamping members in the direction of the closure member to tighten the closure member against the gasket ring, and handle members on the actuating shafts for moving the clamping members to and from clamping position.

4. In a device of the character described, a cover member having a fill opening therein and a seat encircling the opening, a closure member hinged to the cover member, spaced actuating shafts rotatably mounted in the closure member, clamping lugs loosely and slidably retained on said actuating shafts for rotation therewith, intermeshing gear segments associated with the lugs to operate the lugs in synchronism, means yieldingly retaining the lugs in clamping position, and handle members on the actuating shafts for moving the lugs to and from clamping position.

5. In combination with a member having a fill opening therein and having a depending flange encircling the fill opening and provided with a notch, a closure member for said fill opening, means hinging the closure member to said first named member, a clamping member movably mounted on the closure member, means yieldingly urging the clamping member against said flange and into said notch, and means carried with the closure member for moving the clamping member to and from engagement with said notch.

6. In combination with a member having a fill opening and having a depending flange encircling the fill opening and provided with a notch, a closure member for said fill opening, means hinging the closure member to said first named member, a shaft rotatably mounted in the closure member, a clamping member rockingly mounted on said shaft and having a lug for engaging the flange and notch, means yieldingly urging the clamping member against said flange and into the notch for clamping the closure member over said fill opening, and means for rotating the shaft to move said clamping member into and out of engagement with said notch.

7. In combination with a member having a fill opening therein, a closure member for said opening including means hinging the closure member to said first named member, a pair of shafts rotatably mounted in the closure member, intermeshing gear segments fixed to the shafts for rotation therewith and to rock on pivotal axes transversely of the axes of the shafts, lugs on the gear segments for engaging the first named member to clamp the closure member to said first named member, springs on the shafts for resisting said rocking movement to retain the lugs in clamping engagement with the first named member, and lever members fixed to the shafts above the closure member to rotate the shafts for moving the lugs into and out of clamping engagement.

8. In combination with a member having a fill opening therein, a closure member for said opening, means hinging the closure member to said first named member, a pair of shafts rotatably mounted in the closure member and having flattened end portions, intermeshing gear segments having elongated openings for engagement on the flattened end portions of the shafts whereby the gear segments are adapted to rotate with the shafts and to rock on the flattened portions thereof, lugs carried by the segments and engaging the first named member to clamp the closure member to said first named member, springs sleeved on the shafts and having one end bearing against the gear segments, means on the shafts engaging the opposite ends of the springs to retain the springs under tension for resisting said rocking movement, and lever members fixed to the opposite ends of the shafts above the closure member to rotate the shafts for moving the lugs into and out of engagement with the first named member.

9. In a tank having a fill opening, and a seat encircling the fill opening, a closure for the tank having its periphery engaging said seat, clamping members carried by the closure and engaging below said seat, springs engaging the clamping members to retain the clamping members in engaged position to yieldingly anchor the closure member to the seat, and means for interconnecting said clamping members for simultaneously moving the clamping members to and from engaging position.

10. In a device of the character described, an annular seat member, a closure having its periphery engaging the seat member, shafts rotatably mounted in the closure, clamping members loosely mounted on the shafts for engaging the seat member, springs on the shafts and engaging the clamping members for retaining the clamping members in clamping engagement with the seat member and yieldingly anchoring the closure on the seat member, and means for actuating the shafts to move the clamping members to and from engaged position.

11. In a tank having a fill opening and a seat encircling the fill opening, a closure for the fill opening having its peripheral edge engaging on said seat, means for hingedly anchoring the closure member relatively to said seat, a shaft rotatably mounted in the closure, a clamping member loosely mounted on the shaft and engaging below said seat, and a spring carried by the shaft engaging the clamping member to retain the clamping member in engaging position and yieldable to allow movement of the shaft through said clamping member whereby the closure is adapted for slight hinging movement away from said seat.

OTTO N. GREDELL.